Inventor
Reuben H. Zima
By [signature]
Attorney

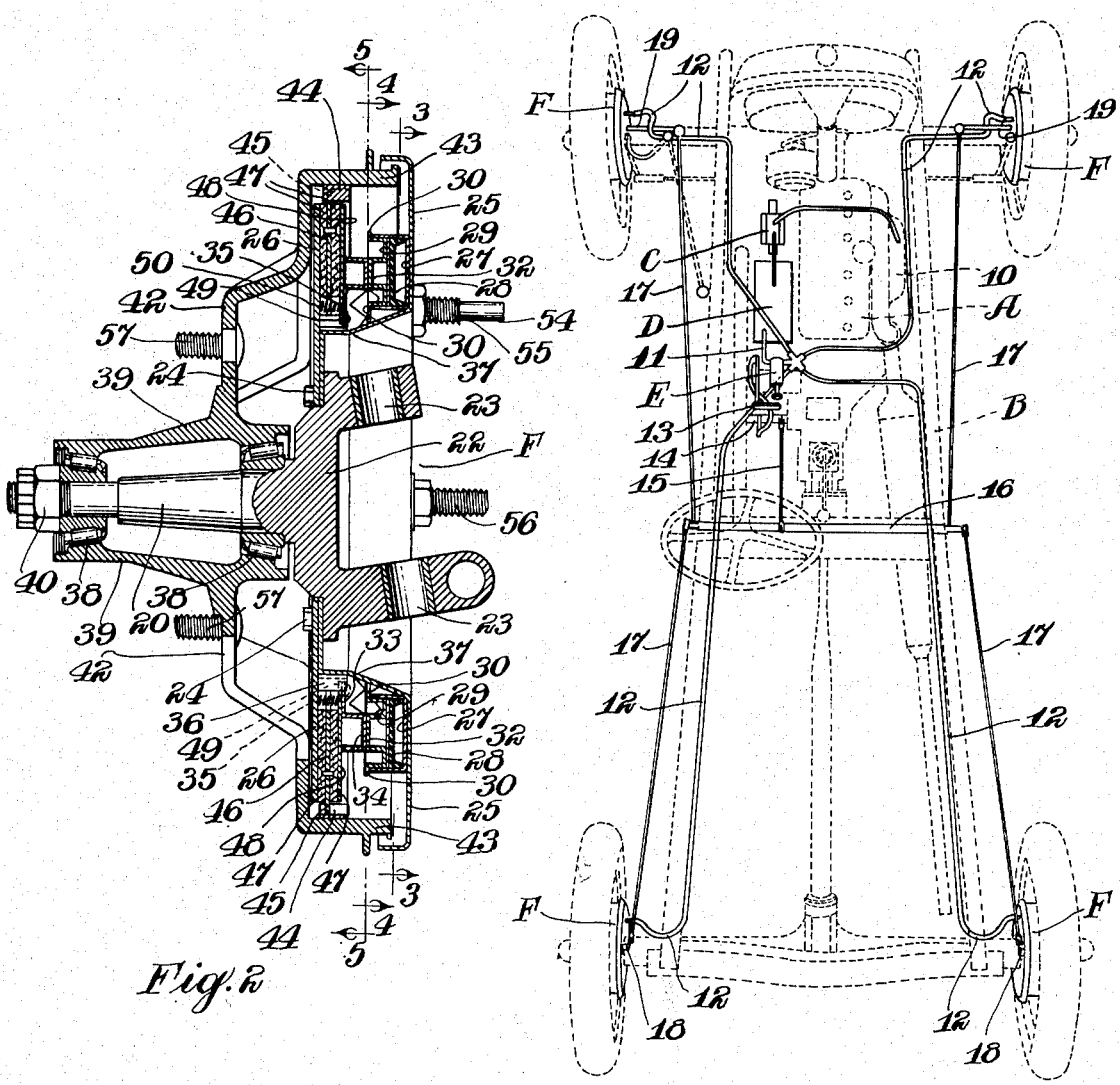

April 26, 1938.  R. H. ZIMA  2,115,661

BRAKE

Filed Jan. 30, 1935  3 Sheets-Sheet 3

Inventor
Reuben H. Zima

By
Attorney

Patented Apr. 26, 1938

2,115,661

UNITED STATES PATENT OFFICE 2,115,661

BRAKE

Reuben H. Zima, Minneapolis, Minn.

Application January 30, 1935, Serial No. 4,075

5 Claims. (Cl. 188—72)

My invention relates to an improvement in combination mechanical and air brake, particularly of use for motor vehicles and the like. It is the purpose of my invention to provide a brake which may be operated either by air pressure or by mechanical means. In this way all of the features of advantage of an air brake for vehicles are combined with the desirable features of a mechanical means of operating the brake either in an emergency or as a safety brake.

It is my purpose to provide an air brake with a minimum of operating parts and with a simplicity of operation which will insure proper operation of the brake at all times. The only moving parts of the brake are so designed that they may be readily replaced if worn; but the operation is such that there is but little aptitude for wear.

It is my object to provide a greater friction surface for braking purposes than is ordinarily provided within a brake drum of a given size. This I accomplish by providing flat friction rings secured to a disc which rotates with the wheel of the vehicle or device. Braking is accomplished by applying pressure upon one of two discs mounted on opposite sides of the friction disc in a manner to squeeze the friction disc between the two brake discs. A very large friction is thus presented, and this friction surface extends between each brake disc and its adjacent friction ring on the friction disc.

It is a feature of my invention that the pressure forcing the brake discs together with the friction disc sandwiched therebetween acts upon the discs in such a manner that the pressure is virtually equal over the entire area contacting with the friction disc. When the brake is operated by air, this feature is accomplished by providing an expandible ring which acts with equal force entirely about the ring. When the brake is operated by mechanical means, the brake disc engaged is actuated by a ring cam means. This cam means is actuated by a complementary cam which at all times engages the cam means at a great number of points at short distances apart throughout the circumference. In this manner, regardless of whether the brake is actuated by air or by mechanical means entirely, the brake discs are forced into contact with the friction disc equally over the entire braking surface.

It is an object of my invention to provide a single braking unit in each brake which may be operated either by air pressure or by mechanical means. The brake is thus simplified to a great extent. It is a further purpose of my invention to provide a brake having the friction surfaces all connected on to a single member, so that in relining the brake, the friction disc may merely be replaced by a new disc bearing the friction rings which have been previously attached thereto.

It is a further feature of my invention to provide an expansible element in the form of a resilient ring, preferably channel-shaped in cross-section, which acts in conjunction with a rigid channel-shaped member of ring shape. Air pressure introduced within the channel-shaped resilient ring acts not only to expand the element as a whole by sliding the resilient ring axially in the rigid ring, but also acts to force the edges of the resilient channel-shaped ring against the walls of the rigid ring, thus acting to seal the element against the escape of air.

These and other objects and novel features of my invention will be more fully and clearly set forth in the following specification and claims.

In the drawings forming a part of my specification:

Figure 1 is a diagrammatic plan view of an automobile chassis, illustrating the manner of operation of my brakes.

Figure 2 is a vertical cross-sectional view through a wheel hub, wheel mounting, and brake drum.

Figure 3:
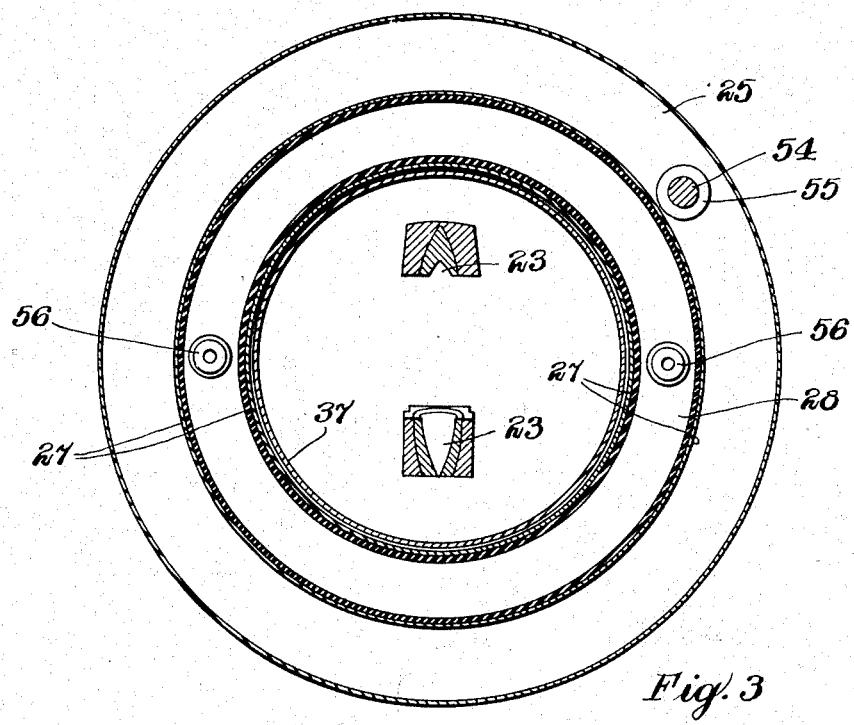
Figure 3 is a cross-sectional view on the line 3—3 of Figure 2.

Compressed air for operating my brake may be provided in any suitable manner. In Figure 1, the engine A of the car B is shown provided with a pump C actuated by vacuum pressure from the car manifold 10 to create an air pressure in the tank D. The air under pressure is introduced to a regulating valve E by means of a conduit 11, from where it passes through conduits 12 to the various brake mechanisms F.

The brakes F may be manually operated by mechanical means. As shown in Figure 1, the brake pedal 13 on the shaft 14 operates the rod 15 to rotate the shaft 16. The rod 16 is connected by means of rods 17 to the rocker arms 18 or to the brake operating shafts 19 by means of which the brake is operated. As the manual system illustrated is ordinary well known construction. It is not shown in detail in the drawings. While the manual brake is shown as connected to be operated by a foot lever, which preferably can be set in depressed position, it is obvious that the mechanical connection from the brakes F may be just as well connected to a hand brake lever for actuation thereby.

Figure 5:
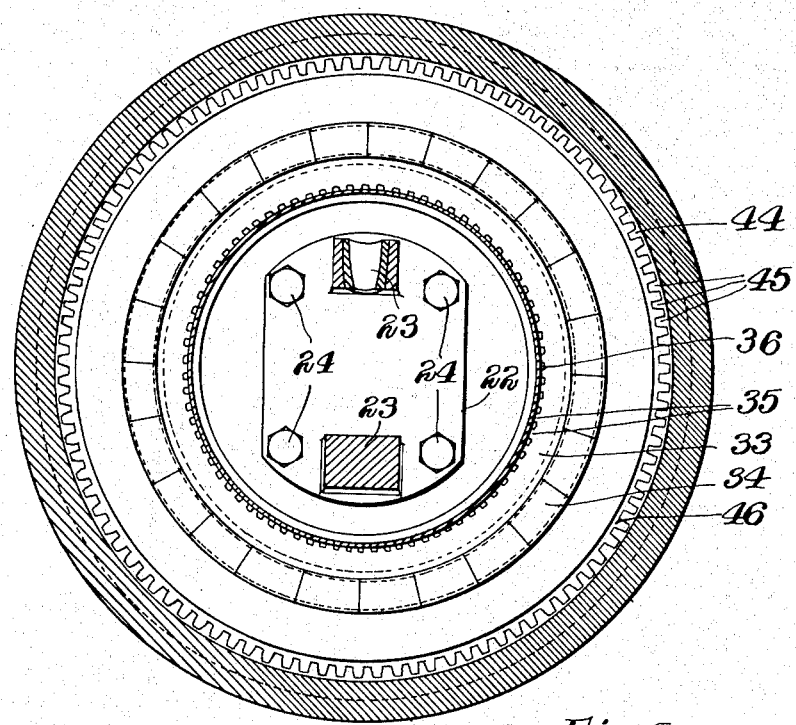
Figure 5 is a cross-sectional view on the line 5—5 of Figure 2.

In Figure 2 is shown a cross-sectional view of a wheel hub. The spindle 20 is attached to a pivotal mounting bracket 22 provided with aligned bearings 23. As illustrated in Figure 5, the bracket 22 is attached by bolts 24 to the inner casing 25 and to the brake disc 26, the latter of which may be seen in Figure 2. The casing 25 is offset or extends inwardly a substantial distance from the brake disc 26 as may be seen in Figure 2, leaving the bracket 22 in a well in the center of the housing as shown.

Secured to the housing 25, I provide a ring 27 of metal or other suitable material which is channel-shaped in cross-section. Within this channel ring 27 is provided a resilient ring 28 which is also channel-shaped in cross-section, and which is reversed with respect to the channel ring 27 so that the opposed sides of the resilient ring 28 extend in a direction opposite the direction of extension of the sides of the channel ring 27. The sides of the resilient channel ring 28 are substantially shorter than the sides of the channel ring 27; and to fill up the channel ring 27, a channel-shaped ring 29, inverted with respect to the resilient channel 28 and having edge flanges 30 extending over the opposed walls of the channel ring 27 is provided. In other words, the channel ring 27 attached to the housing 25 contains two separate channel-shaped members; a resilient channel ring 28 and an inverted channel-shaped ring 29 limited in its movement into the channel 27 by edge flanges 30.

The channel-shaped ring 29 is provided with an undulating cam surface 32 extending continuously about the same at the base of the channel. As may be best seen in Figure 6 of the drawings, this surface provides a series of wedge-shaped or triangularly-shaped projections extending continuously about the same. A complementary cam ring 33 engages the cam surface 32, and is provided with an undulating cam surface 34 which corresponds with the surface 32. To prevent the cam ring 33 from rotating relative to the inner housing 25, the cam ring 33 is provided with internal teeth 35 which engage in a ring gear 36 which is mounted on the inner housing adjacent the offset 37 therein spacing the housing from the brake disc 26.

Roller bearings 38 space the spindle 20 from the spindle housing 39 surrounding the same. The bearings 38 and the housing 39 are held in position upon the spindle 20 by means of the nut 40 on the end of the shaft. A spider 42 is connected to the spindle housing 39 to support the outer protecting ring 43, enclosing the brake mechanism, and overlapping with the inner housing 25 to virtually enclose the brake.

An internal ring gear 44 is secured within the protecting ring 43 for engagement with the teeth 45 of the brake friction disc 46. This friction disc 46 provides a support for two flat rings 47 of friction brake material, one of which is secured on either side of the friction disc 46. One of the rings 47 is adapted to engage the brake disc 26, while the opposite ring 47 is for engagement with a brake disc 48 which is provided with internal teeth 49 for engagement with the ring gear 36, and which is positioned between the cam disc 33 and the friction ring 47. Small coil springs 50 normally hold the brake discs 26 and 48 spaced apart.

Figure 4:
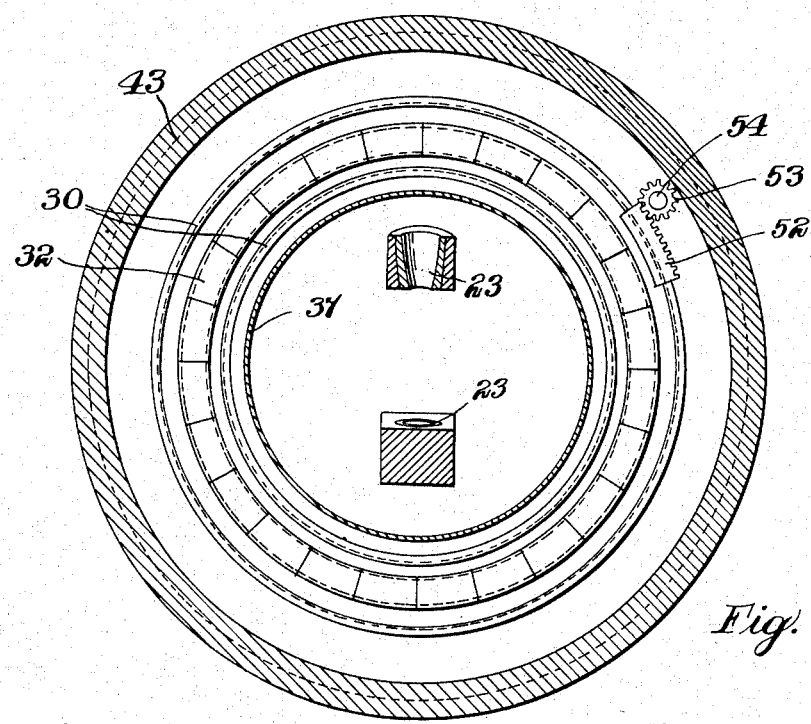
Figure 4 is a cross-sectional view on the line 4—4 of Figure 2.
Figure 6:
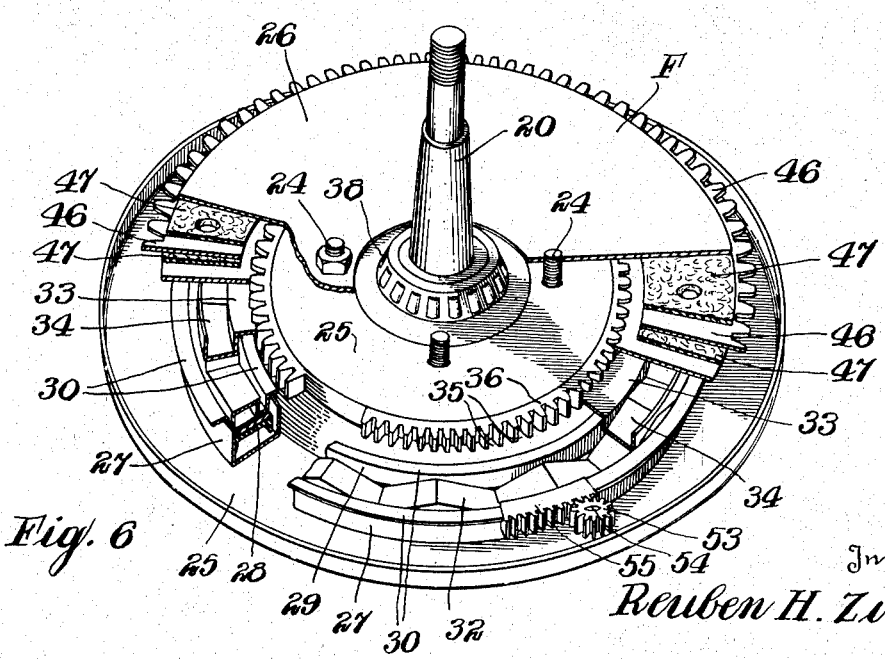
Figure 6 is a perspective view of a wheel hub, showing a part of the brake drum and brake operating parts broken away to show the relative location of these parts.

Attached to the edge flange 30 on the outer side of the channel-shaped ring 29 is a gear segment 52, as illustrated in Figures 4 and 6. This segment 52 meshes with a pinion gear 53 having a shaft 54 extending through the inner housing 25. The nipple 55 forms a bearing through which the shaft 54 extends. This shaft forms the operating shaft for the mechanical operation of the brake, as will be more clearly set forth in the operation of my brake. A nipple 56, or pair of nipples as in Figure 3, forms the connection with conduits 12 conveying air pressure from the pressure regulating valve E. The wheel is attached to the spider 42 by any suitable means, such as through the use of the bolts 57 illustrated in Figure 2.

In operation, the pump C provides an air pressure in the tank D. When the valve E is actuated, pressure passes through the conduits 11 and 12 to the brakes F, entering through the nipple 56, or the pair of nipples 56.

The entrance of air under pressure at the base of the channel ring 27 acts to press the sides of the resilient channel ring 28 against the opposed walls of the channel ring 27 to prevent leakage of air about the ring 28. The pressure also forces the resilient ring 28 against the channel-shaped ring 29 having the undulating cam surface 32. The ring 29 presses against the cam ring 33, which in turn forces the brake disc 48 against the friction ring 47 on the friction disc 46, and presses the opposed friction surface 47 against the brake disc 26.

As the brake discs 26 and 48 are secured to the housing 25 against rotation, and as the friction disc 46 is rotatable with the spider 42 and consequently with the wheel of the vehicle, the pressure of the brake friction surfaces 47 against the stationary brake discs 26 and 48 provide a strong braking power tending to stop rotation of the vehicle wheel. When the air is released, the brake discs 26 and 48 are again separated by the coil springs 50, forcing the resilient ring 28 back into its position.

When the brake is operated manually, the series of brake rods is such as to provide a means of rotating the shaft 54. When the shaft 54 is rotated, the pinion gear 53 on this shaft engages the gear segment 52 on the edge flange 30 of the channel-shaped ring 29, acting to rotate this ring, the edge flanges sliding along the outer edges of the sides of the channel ring 27. In this manner, the undulating surface 32 on the ring 29 is moved with respect to the cam ring 33, which is held from rotation by engagement with the ring gear 36. Such relative movement between the cam surface 32 and the surface 34 of the cam ring 33 acts to force the brake disc 48 against the friction disc 46 and to squeeze the friction disc 46 bearing the friction surfaces 47 between the brake discs 26 and 48, tending to brake the rotation of the spider 42 and the wheel attached thereto.

It may be seen that by the use of the complementary cam surfaces 32 and 34 the brake disc 48 is forced evenly from all sides thereof, and from a great number of points spaced throughout the circumference of the braking surface. It may also be seen that the braking surface is very large for the diameter of the brake housing, as there are provided two braking surfaces of large area.

I have described my brake as being formed with a single pair of brake surfaces which act in combination with brake discs; and it should be understood that more brake surfaces could be provided to act in combination with more rotatable discs if desired. In other words, the number of flat friction surfaces could be multiplied without changing the invention.

In accordance with the patent statutes, I have described the principles of operation of my brake, and while I have endeavored to set forth the best embodiment thereof, I desire to have it understood that this is only illustrative of a means of carrying out my invention, and that obvious changes may be made within the scope of the following claims without departing from the spirit of the invention.

I claim:

1. In a brake interposed between a rotary member and a stationary member, a series of discs, some of which are secured to rotate with said rotary member, and some of which remain stationary with said stationary member, and means for urging said discs against one another, said last named means including a channel, a ring therein, spaced from said channel base to provide a fluid space therebetween; a channel extending into said first named channel, a cam surface thereon, a third channel interfitting with said second named channel and having a cooperating cam surface engageable with said first cam surface, and means for rotating one of said cam surfaced channels with respect to the other.

2. A vehicle brake including circular braking elements, and ring means actuated by air pressure for causing said braking elements to move into working position to brake the rotation of a wheel of a vehicle, said ring means comprising a channel ring, a resilient ring in said channel ring and operable by air pressure, a channel extending into said first named channel into engagement with said resilient ring, a cam surface on said second named channel, a third channel interfitting into said second named channel, a cam surface on said third channel cooperating with the first cam surface, and rack and pinion means for rotating one cam.

3. A vehicle brake including a series of circular elements, and ring means engageable to urge said elements together to brake rotation of a vehicle wheel, said ring means comprising a pair of cooperating channels forming cam rings nesting one within the other and relatively rotatable to expand the thickness of said ring to urge said elements together, a gear segment on one of said cam rings, and a pinion engaging said segment for rotating said one cam ring with respect to the other.

4. A vehicle brake including a series of circular elements, and ring means engageable to urge said elements together to brake rotation of a vehicle wheel, said ring means including a channel ring, an expandible member therein, a pair of cooperable cam rings, a gear segment on one of said cam rings, a pinion engageable with said gear segment to rotate said one cam ring with respect to the other to expand said ring means to urge said elements together, and means for introducing a fluid into said expandible member to expand said ring means.

5. A vehicle brake including a series of circular elements, means holding said elements normally spaced, and ring means for urging said elements together, said ring means comprising a channel, a resilient seal in said channel, a pair of cooperable cam rings extending into said channel, means introducing fluid into said channel within said seal for urging said cam rings in unison against said elements to urge said elements together, and means for rotating one of said cam rings with respect to the other to expand the thickness of said ring means to urge said elements together.

REUBEN H. ZIMA.